United States Patent [19]
Kahana

[11] Patent Number: 5,637,214
[45] Date of Patent: Jun. 10, 1997

[54] FILTER ASSEMBLY FOR WATER TREATMENT APPARATUS

[76] Inventor: Dov Kahana, 880 Yale La., Highland Park, Ill. 60035

[21] Appl. No.: 555,605

[22] Filed: Nov. 9, 1995

[51] Int. Cl.$^6$ .................. B01D 27/08; B01D 29/085
[52] U.S. Cl. .................. 210/282; 210/448; 210/477; 210/498; 222/189.07; 222/399
[58] Field of Search .................. 210/264, 265, 210/282, 418, 477, 448, 452, 498; 222/399, 189.07

[56] References Cited

U.S. PATENT DOCUMENTS

| | | | |
|---|---|---|---|
| 2,359,936 | 10/1944 | Peterson | 210/498 |
| 4,895,648 | 1/1990 | Hankammer | 210/188 |
| 5,049,272 | 9/1991 | Nieweg | 210/282 |
| 5,087,357 | 2/1992 | Villa | 210/282 |
| 5,190,643 | 3/1993 | Duncan et al. | 210/282 |
| 5,225,078 | 7/1993 | Polasky et al. | 210/264 |
| 5,238,559 | 8/1993 | Nieweg | 210/264 |
| 5,238,576 | 8/1993 | Affonso | 210/282 |
| 5,370,041 | 12/1994 | Lowe | 210/282 |
| 5,411,661 | 5/1995 | Heiligman | 210/264 |

OTHER PUBLICATIONS

Brita Tap Into Great Taste! Advertisement (Author and Date Unknown).
Brita Makes Tap Water Taste Great Product Literature (Author and Date Unknown).
Brita Pure Convenience Product Literature (Author and Date Unknown).

Primary Examiner—W. L. Walker
Attorney, Agent, or Firm—Marshall, O'Toole, Gerstein, Murray & Borun

[57] ABSTRACT

A filter assembly adapted to be used in a water treatment apparatus for removing impurities from tap water provided to residential users, having a filter housing with an opening formed therein, a filter bag composed of a porous material disposed in the filter housing, filter media contained in the filter bag, and a lid adapted to cover the opening of the filter housing. The filter housing has an upper end and a lower end each having a plurality of apertures formed therein. The filter media contained in the filter bag is composed of individual particles having a mean diameter large enough to prevent the particles from passing through the porous material of the filter bag. The apertures formed in the lower end of the filter housing may comprise elongate slots, and the mean diameter of the individual particles of the filter media may be less than the width of the elongate slots formed in the lower end of the filter housing. The lower end of the filter housing may comprise an annular portion and a central portion which extends upwardly from the annular portion, and the upwardly extending central portion may maintain the filter bag out of contact with the annular portion so as to form an annular chamber substantially unobstructed by the filter bag.

16 Claims, 3 Drawing Sheets

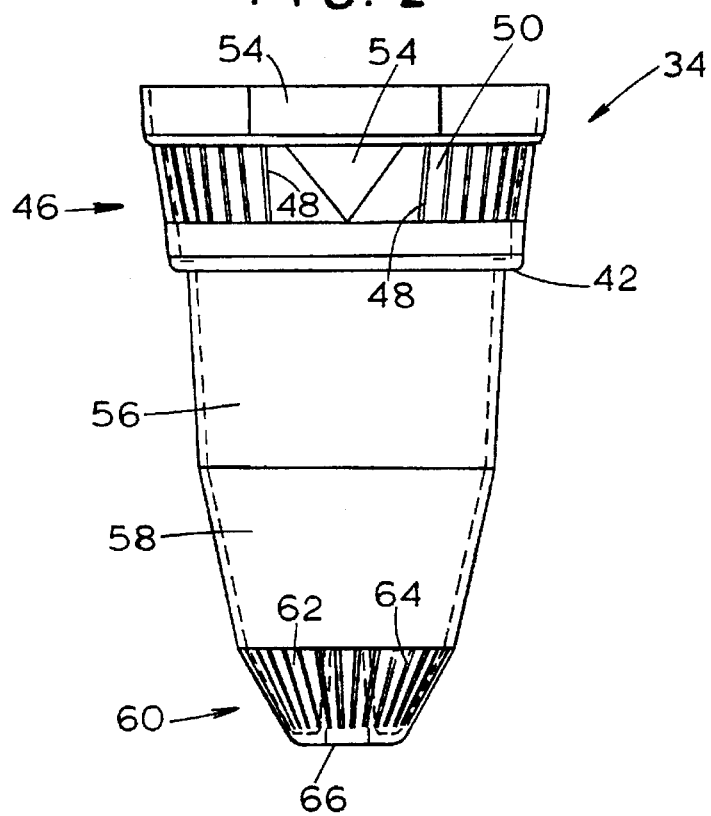
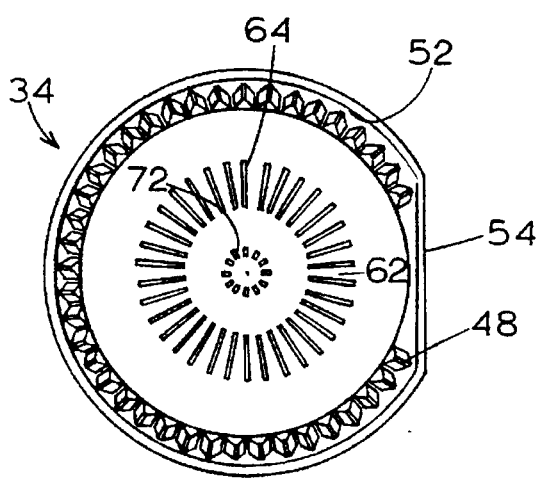
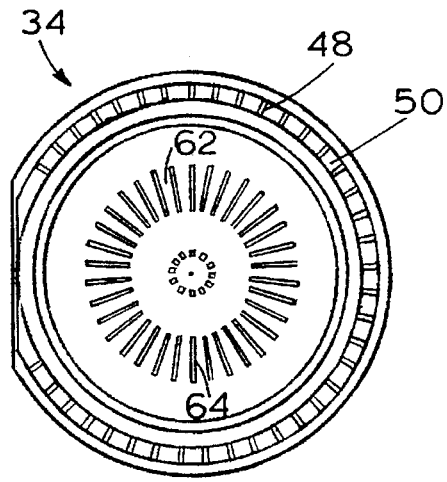

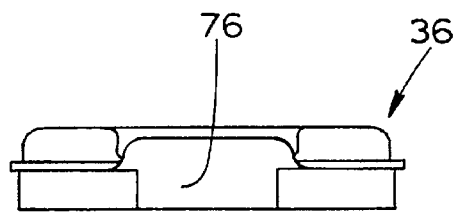
FIG. 5
FIG. 6
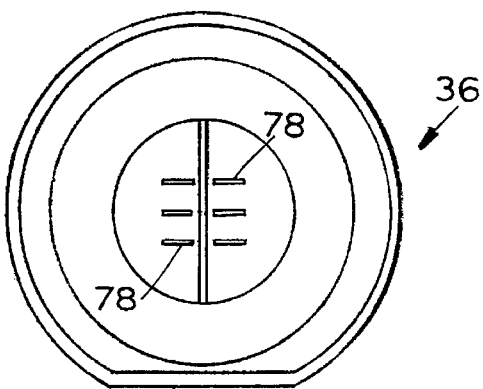
FIG. 7
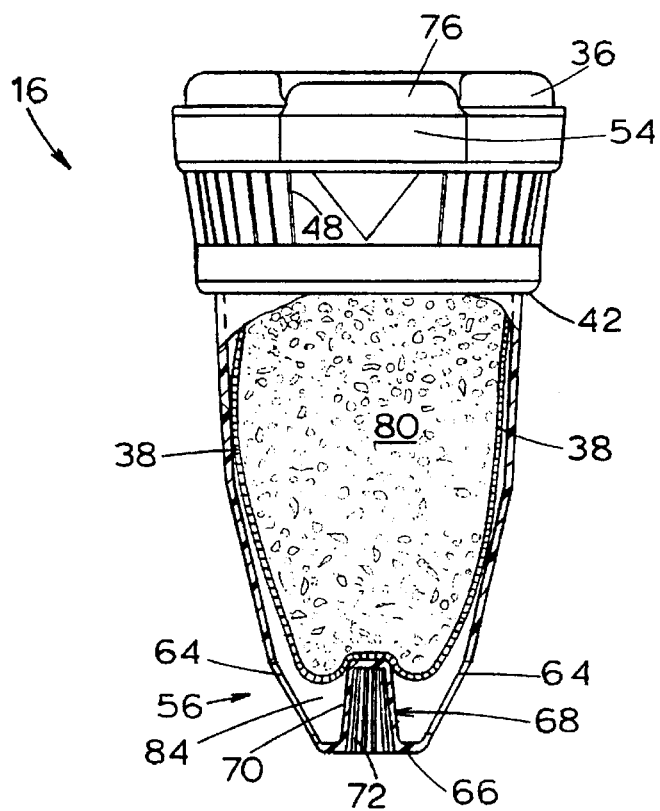

FILTER ASSEMBLY FOR WATER TREATMENT APPARATUS

BACKGROUND OF THE INVENTION

The present invention is directed to a filter assembly for residential use in a water treatment apparatus for the treatment of tap water.

Various relatively inexpensive water treatment devices have been marketed for the in-home treatment of tap water. One such device is a Brita® water filtration system which is composed of a water pitcher having a cover with an opening formed therein to facilitate the insertion of a removable filter assembly. The filter assembly is composed of a generally cylindrical plastic housing in which loose filter media, in the form of small filter particles, is provided. The filter assembly is provided with a lid having many small apertures formed therein to facilitate the flow of tap water into the filter assembly. The bottom end of the filter housing also has numerous small apertures formed therein to allow the tap water to flow out the bottom of the filter housing into the pitcher after it is filtered by passing through the filter media.

One problem with the Brita® water treatment system is that the relatively small filter particles may escape through the apertures in the filter housing. To minimize escape of the filter particles, the apertures formed in the filter housing must be made unnecessarily small, and thus may retard the free flow of water through the filter housing and increase the time required for the filtration system to operate.

After significant use of the Brita® water treatment system, the filter assembly must be replaced to provide fresh filter media. However, since the filter media is loosely provided within the filter housing, the entire filter assembly, including the filter housing, must be replaced, thus increasing the cost of the replaceable filter assembly to the user of the filtration system. Also, this is an environmentally unsound practice since it is necessary to dispose of large quantities of waste plastic comprising the filter housings.

SUMMARY OF THE INVENTION

The invention is directed to a filter assembly adapted to be used in a water treatment apparatus for removing impurities from tap water provided to residential users. The filter assembly has a filter housing with an opening formed therein, a filter bag composed of a porous material disposed in the filter housing, filter media contained in the filter bag, and a lid adapted to cover the opening of the filter housing. The filter housing has an upper end and a lower end having a plurality of apertures formed therein. The filter media contained in the filter bag is composed of individual particles having a mean diameter large enough to prevent the particles from passing through the porous material of the filter bag.

The apertures formed in the lower end of the filter housing may comprise elongate slots and/or holes, and the mean diameter of the individual particles of the filter media may be less than the width of the elongate slots and/or holes formed in the lower end of the filter housing.

The lower end of the filter housing may comprise an annular portion and a central portion which extends upwardly from the annular portion, and the upwardly extending central portion may maintain the filter bag out of contact with the annular portion so as to form an annular chamber substantially unobstructed by the filter bag.

The invention is also directed to a water treatment apparatus having a pitcher with a handle, a container portion fixed to the handle and adapted to receive filtered water, an insert having an opening formed therein, and a filter assembly as described above disposed in the opening in the insert.

These and other features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIG. 2 is a side view of a filter housing of the filter assembly of FIG. 1;

FIG. 3 is a top view of the filter housing of FIG. 2;

FIG. 4 is a bottom view of the filter housing of FIG. 2;

FIG. 5 is a side view of a lid for the filter housing of FIG. 2;

FIG. 6 is a top view of the lid of FIG. 5; and

FIG. 7 is a side view of the filter assembly of FIG. 1 shown partly in cross section.

DETAILED DESCRIPTION OF A PREFERRED EMBODIMENT

Figure 1:
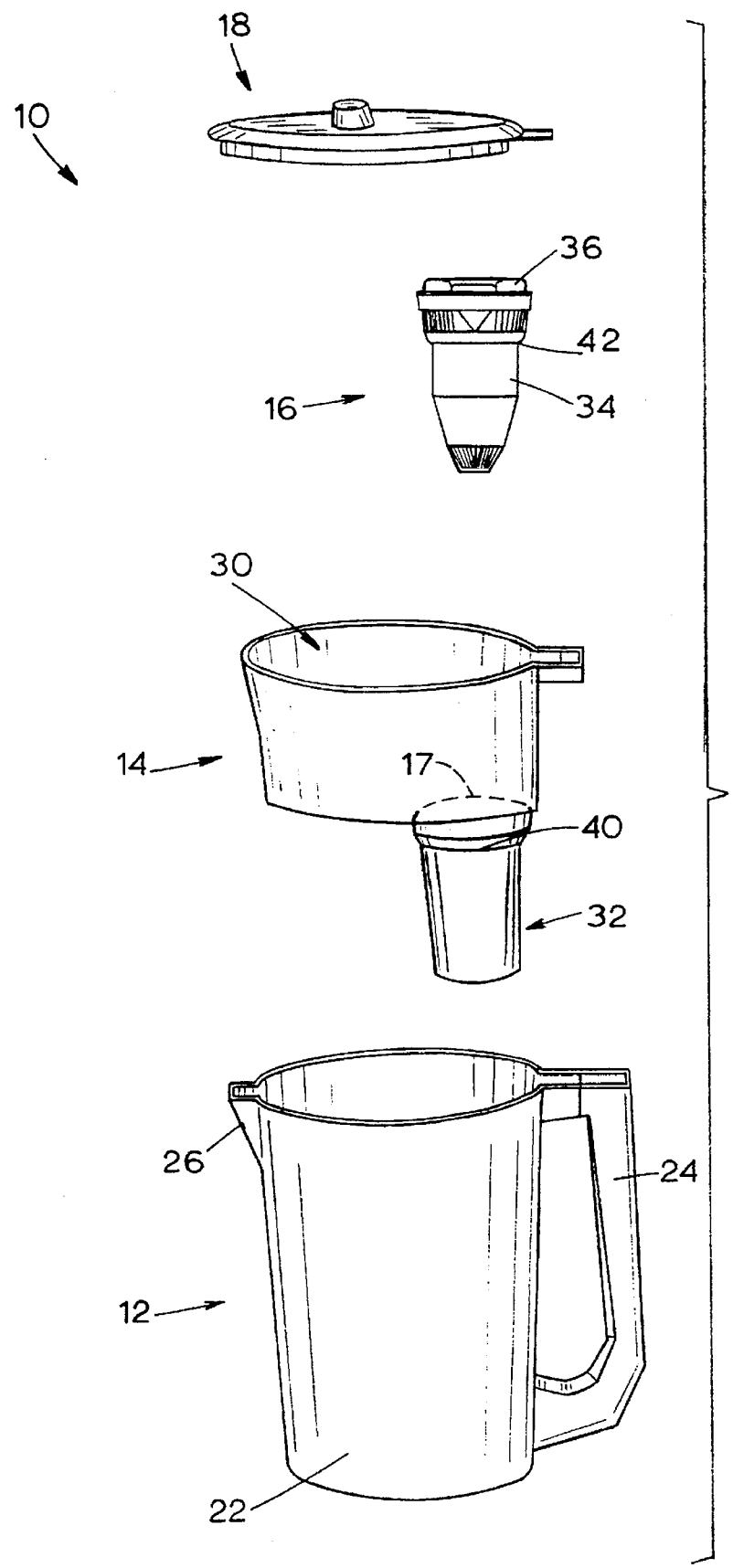
FIG. 1 is an exploded perspective view of a preferred embodiment of a water treatment apparatus having a removable filter assembly in accordance with the invention.

FIG. 1 illustrates a preferred embodiment of a water treatment apparatus 10 for removing impurities, such as lead and chlorine, in tap water provided to residential users. The water treatment apparatus 10 is composed of a pitcher 12, an insert 14 which may be disposed within and removed from the pitcher 12, a filter assembly 16 which is adapted to be disposed within a circular hole 17 in the insert 14, and a pitcher cover 18 which sealingly mates with the top of the pitcher insert 14. The pitcher 12 has a container portion 22 adapted to receive filtered water, a handle 24 fixed to the container portion 22, and a spout 26.

The pitcher insert 14 has a generally cylindrical liquid receptacle 30 in which unfiltered tap water may be accumulated and a generally cylindrical filter holder 32. The filter assembly 16 is composed of a filter housing 34, a lid 36, and a filter bag 38 (FIG. 7). The filter assembly 16 rests within the filter holder 32 and is supported therein by an annular ledge 40, formed in the interior of the filter holder 32, which makes supportive contact with a corresponding annular ridge 42 formed in the filter housing 34. The bottom end of the filter holder 32 may be completely open, or may have a pair of thin cross-braces formed therein, to facilitate the ready passage of water therethrough.

The filter housing 34 is shown in more detail in FIG. 2, which is a side view of the filter housing 34, FIG. 3, which is a top view of the housing 34, and FIG. 4, which is a bottom view of the housing 34. Referring to FIGS. 2–4, the filter housing 34, which may be composed of plastic or another FDA-approved material, has a generally cylindrical upper end 46 with a plurality of apertures preferably in the form of elongate slots 48 formed in a circumferential surface 50 thereof although the apertures may comprise holes or a combination of holes and slots. The upper end 46 of the housing 34 has a generally circular opening 52 formed therein, with a flat 54 located on one side of the opening 52.

The filter housing 34 has a central portion composed of a pair of angled, circumferential surfaces 56, 58 and a lower end 60 having an angled circumferential surface 62 with a plurality of apertures preferably in the form of elongate slots 64 formed therein. The housing 34 also has an annular, planar bottom face 66, and a frustoconical member 68 (shown more clearly in FIG. 7) that extends upwardly from the central portion of the annular face 66 and has a circumferential side surface 70 with a plurality of elongate slots 72 formed therein. As for the apertures in the angled circumferential surface 62 in the filter housing 34, they may also take the form of holes or a combination of holes and slots in the same manner as the apertures which are formed in the circumferential surface 50.

FIGS. 5 and 6 illustrate the lid 36 of the filter assembly 16 in greater detail as being generally circular and formed to have a flat 76 to correspond to and be aligned with the flat 54 formed in the filter housing 34 when the lid 36 is on the filter assembly 16. The aligned flats 54 and 76 then register with a corresponding flat on the filter holder 32 to properly position the filter assembly 16. When the flats are in registration, the annular ledge 40 of the filter holder 32 is in supportive contact with the annular ridge 42 of the filter assembly 16 and no unfiltered water may flow past the filter assembly 16 directly into the container portion 22 of the pitcher 12.

The lid 36 may be removably connected to the filter housing 34 in any conventional manner, such as by threads (not shown) or by being dimensioned to provide an interference or snap fit with the housing 34. The top of the lid 36 may be provided with a number of apertures preferably in the form of elongate slots 78 or holes (not shown) or a combination of slots and holes (not shown) to facilitate the passage of water therethrough.

Referring to FIG. 7, filter media 80 is provided within the interior of the filter bag 38, which is composed of a porous material to allow ready passage of tap water therethrough. The filter material may be composed of paper, polyester, or any other FDA-approved filter material. The filter media 80 may be composed of individual particles having a mean diameter large enough to prevent the particles 80 from passing through the porous material of the filter bag 38, and the mean diameter of the filter particles 80 may be quite small and considerably less in diameter than the width of the elongate slots 64 formed in the circumferential side surface 62 of the filter housing 34 to enhance the quality of filtration achieved. Because the filter bag 38 is completely sealed and the mean diameter of the filter particles 80 is greater than any pores present in the filter bag material, the filter particles 80 are maintained within the bag 38. The filter media 80 may comprise activated carbon particles, silver-impregnated activated carbon particles, iodine resin, ion-exchange resin, or a mixture of those components.

As shown in FIG. 7, when the filter bag 38 is placed within the filter housing 34 and the lid 36 is placed on the filter housing 34, the frustoconical member 68 supports the filter bag 38 above the annular bottom portion 66 so that an annular chamber 84 is formed, the annular chamber 84 being substantially unobstructed by the filter bag 38 and having the relatively wide elongate slots 64 to facilitate escape of filtered water from the filter assembly 16 into the pitcher 12.

Referring to FIG. 1, when the water treatment apparatus 10 is in use, with the filter assembly 16 supported by the filter holder 32, the pitcher insert 14 disposed within the pitcher 12, and the cover 18 removed, tap water is run into and collects within the receptacle 30 in the pitcher insert 14. The water enters the filter assembly 16, via the slots 78 in the cover 36 (FIG. 6) and the slots 48 in the filter housing 34 (FIG. 2), passes through the filter media 80 in the filter bag 38, exits the bottom of the filter assembly 16 via the slots 64, 72 (FIGS. 2–4), and collects in the container portion 22 of the pitcher 12.

After prolonged use, such as after approximately 200 liters (50 gallons) of water have been filtered, the filter assembly 16 is removed from the pitcher insert 14, the lid 36 is removed from the filter housing 34, the filter bag 38 is removed and replaced with a new filter bag 38, the lid 36 is replaced on the filter housing 34, and the filter assembly 16 is reinserted into the filter holder 32 in the pitcher insert 14. Thus, there is no need to discard the filter housing 34 and lid 36 when replacing the filter media.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A water treatment apparatus, comprising:
   a pitcher having a handle fixed to a container portion adapted to receive filtered water, and an insert having a circular opening formed therein, said circular opening being adapted to receive a removable filter assembly; and
   a removable filter assembly disposed in said opening in said insert, said removable filter assembly comprising:
   a filter housing having an upper end and a lower end, said upper end of said filter housing having a circular opening formed therein, said lower end of said filter housing having an annular planar portion and also having a frustoconical portion which extends upwardly from said annular planar portion toward said upper end of said filter housing, said frustoconical portion having a circumferential side surface with a plurality of apertures formed therein, said apertures having a maximum dimension;
   a filter bag composed of a porous material disposed in said filter housing;
   filter media disposed in said filter bag, said filter media being composed of individual particles having a mean diameter large enough to prevent said particles from passing through said porous material of said filter bag, said mean diameter of said individual particles being less than said maximum dimension of said apertures formed in said circumferential side surface of said filter housing; and
   a lid adapted to cover said circular opening of said filter housing, said lid having a plurality of apertures formed therein to facilitate passage of water through said lid, through said filter bag disposed in said filter housing, through said filter housing, and into said container portion of said pitcher.

2. An apparatus as defined in claim 1 wherein said filter media comprises activated carbon particles.

3. An apparatus as defined in claim 1 wherein said filtration media comprises silver-impregnated activated carbon particles.

4. An apparatus as defined in claim 1 wherein said filtration media comprises iodine resin.

5. An apparatus as defined in claim 1 wherein said filtration media comprises an ion-exchange resin.

6. A filter assembly adapted for a water treatment apparatus having a circular filter assembly opening, said filter assembly comprising:
   a filter housing having an upper end and a lower end, said upper end of said filter housing having an opening formed therein, said lower end of said filter housing having an annular portion and also having a central portion which extends upwardly from said annular portion toward said upper end of said filter housing, said central portion having a circumferential side surface with a plurality of elongate slots formed therein, said elongate slots having a width;

a filter bag composed of a porous material disposed in said filter housing;

filter media disposed in said filter bag, said filter media being composed of individual particles having a mean diameter large enough to prevent said particles from passing through said porous material of said filter bag, said mean diameter of said individual particles being less than said width of said elongate slots formed in said circumferential side surface of said filter housing; and a lid adapted to cover said opening of said filter housing, said lid having a plurality of apertures formed therein to facilitate passage of water through said lid, through said filter bag disposed in said filter housing, and through said filter housing.

7. An assembly as defined in claim 6 wherein said central portion of said filter housing comprises a frustoconical portion.

8. A filter assembly adapted to be used in a water treatment apparatus, said filter assembly comprising:

a filter housing having an upper end and a lower end, said upper end of said filter housing having an opening formed therein, said lower end of said filter housing having a plurality of apertures formed therein;

a filter bag composed of a porous material disposed in said filter housing;

filter media disposed in said filter bag, said filter media being composed of individual particles having a mean diameter large enough to prevent said particles from passing through said porous material of said filter bag;

said lower end of said filter housing comprising an annular bottom surface portion having said apertures therein and including means associated with said annular bottom surface portion for maintaining said filter bag out of contact with said annular bottom surface portion so as to form an open chamber between said apertures and said filter bag whereby said apertures are substantially unobstructed by said filter bag; and a lid adapted to cover said opening of said filter housing.

9. An assembly as defined in claim 8 wherein said lid has a plurality of apertures formed therein to facilitate passage of water through said lid.

10. An assembly as defined in claim 8 wherein said apertures formed in said lower end of said filter housing comprise elongate slots.

11. An assembly as defined in claim 10 wherein said mean diameter of said individual particles is less than said width of said elongate slots formed in said lower end of said filter housing.

12. An assembly as defined in claim 8 wherein said means for maintaining said filter bag out of contact with said annular bottom surface portion comprises a central portion which extends upwardly from said annular bottom surface portion.

13. A water treatment apparatus comprising a pitcher having a handle fixed to a container portion adapted to receive filtered water, an insert having an opening formed therein, and a filter assembly as defined in claim 8 disposed in said opening in said insert.

14. A filter assembly adapted to be used in a water treatment apparatus, said filter assembly comprising:

a filter housing having an upper end and a lower end, said upper end of said filter housing having an opening formed therein, said upper end of said filter housing also having a circumferential surface with a plurality of elongate slots formed therein, said lower end of said filter housing having a plurality of apertures formed therein;

a filter bag composed of a porous material disposed in said filter housing;

filter media disposed in said filter bag, said filter media being composed of individual particles having a mean diameter large enough to prevent said particles from passing through said porous material of said filter bag; and a lid adapted to cover said opening of said filter housing.

15. A filter assembly adapted to be used in a water treatment apparatus, said filter assembly comprising:

a filter housing having an upper end and a lower end, said upper end of said filter housing having an opening formed therein, said lower end of said filter housing having a plurality of apertures formed therein, said lower end of said filter housing also having a circumferential surface with a plurality of elongate slots defining said apertures formed therein;

a filter bag composed of a porous material disposed in said filter housing;

filter media disposed in said filter bag, said filter media being composed of individual particles having a mean diameter large enough to prevent said particles from passing through said porous material of said filter bag; and a lid adapted to cover said opening of said filter housing.

16. A filter assembly adapted to be used in a water treatment apparatus, said filter assembly comprising:

a filter housing having an upper end and a lower end, said upper end of said filter housing having an opening formed therein, said lower end of said filter housing having a plurality of apertures formed therein;

said lower end of said filter housing including a frustoconical central portion having a plurality of elongate slots defining said apertures formed therein and wherein said lower end of said filter housing has a circumferential surface with a plurality of elongate slots formed therein;

a filter bag composed of a porous material disposed in said filter housing;

filter media disposed in said filter bag, said filter media being composed of individual particles having a mean diameter large enough to prevent said particles from passing through said porous material of said filter bag; and a lid adapted to cover said opening of said filter housing.

* * * * *